United States Patent Office 3,804,879
Patented Apr. 16, 1974

3,804,879
PGF$_{3\alpha}$
Sune Bergstrom and Jan Sjovall, both % Kemiska Institutionen, Karolinska Institutet, Stockholm, Sweden
No Drawing. Application Feb. 12, 1971, Ser. No. 115,111, now Patent No. 3,706,789, which is a continuation-in-part of application Ser. No. 203,752, June 20, 1962, now Patent No. 3,598,858, which is a continuation-in-part of abandoned application Ser. No. 119,209, Apr. 9, 1962, which in turn is a continuation-in-part of application Ser. No. 738,514, May 28, 1958, now Patent No. 3,069,322. Divided and this application July 3, 1972, Ser. No. 268,439
Int. Cl. C07c 61/32, 69/74
U.S. Cl. 260—468 D                 12 Claims

ABSTRACT OF THE DISCLOSURE

The prostaglandin PGF$_{3\alpha}$, and its salts, esters, and alkanates are disclosed. These novel compounds are useful for a variety if pharmacological purposes, including use as smooth muscle stimulants and as cardiovascular agents.

CROSS REFERENCE TO RELATED APPLICATIONS

This application is a division of our copending application Ser. No. 115,111, filed Feb. 12, 1971, now Pat. No. 3,706,789, which is a continuation-in-part of our copending application Ser. No. 203,752, filed June 20, 1962, now Pat. No. 3,598,858, which is a continuation-in-part of our copending application Ser. No. 119,209, filed Apr. 9, 1962, now abandoned, which is a continuation-in-part of our copending application Ser. No. 738,514, filed May 28, 1958, now Pat. No. 3,069,322.

DESCRIPTION OF THE INVENTION

This invention relates to novel compositions of matter. One aspect of this invention is specifically concerned with novel organic compounds of the formula:

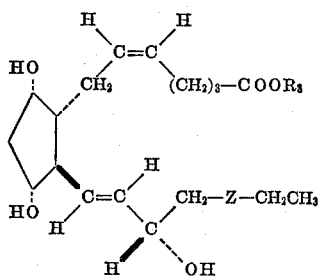

(I)

wherein Z is —CH$_2$CH$_2$— or cis—CH=CH— and R$_3$ is hydrogen or a pharmacologically acceptable cation, said compound being essentially free of pyrogens, antigens, proteins, enzymes, cellular material, and other organic acids or salts thereof.

Another aspect of this invention is specifically concerned with novel organic compounds of the formula:

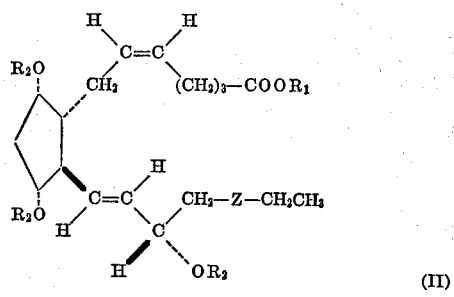

(II)

wherein Z is —CH$_2$—CH$_2$— or cis—CH=CH—, wherein R$_1$ is hydrocarbyl of not more than 1 carbon atoms, and wherein R$_2$ is hydrogen or lower alkanoyl.

Another aspect of this invention is specifically concerned with novel organic compounds of the formula:

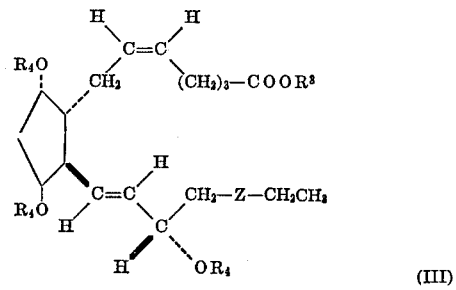

(III)

wherein Z is —CH$_2$CH$_2$— or cis—CH=CH—, wherein R$_3$ is hydrogen or a pharmacologically acceptable cation, and wherein R$_4$ is lower alkanoyl.

Included in Formula I are compounds of the formulas:

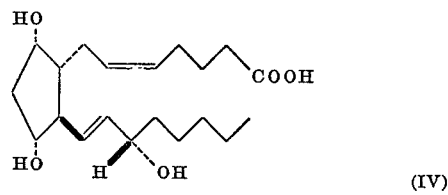

(IV)

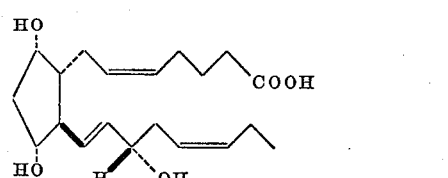

(V)

Included in Formula II are esters and ester-trialkanoates of the acids of Formulas IV and V.

Included in Formula III are trialkanoates of the acids of Formulas IV and V.

Molecules of the compounds encompassed by Formulas I, II, III, IV, and V each have several centers of asymmetry. Formulas I, II, III, IV, and V are intended to represent optically active compounds each with the same absolute configuration as optically active prostaglandin E (PGE), later named prostaglandin E$_1$ (PGE$_1$), and obtained from certain mammalian tissues, for example, sheep vesicular glands. See our said Pat. No. 3,069,332. See also later publications, for example, Bergstrom et al., J. Biol. Chem. 238, 3555 (1963), Bergstrom et al., Pharmacol. Rev. 20, 1 (1968), and references cited in those.

In Formulas I, II, III, IV, and V, a broken line attachment to the cyclopentane ring indicates a chain or group in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in Formulas I, II, III, IV, and V is S.

A systematic name for the compound of Formula IV is 7-[3α,5α-dihydroxy-2β-[(3S)-3-hydroxy-trans-1-octenyl]-cis-5-heptenoic acid. For convenience, this compound is designated PGF$_{2\alpha}$.

A systematic name for the compound of Formula V is 7-[3α,5α-dihydroxy-2β-[(3S)-3-hydroxy-trans-1 - cis - 5-octadienyl]-1α-cyclopentyl]-cis-5-heptenoic acid. For convenience, this compound is designated PGF$_{3\alpha}$.

PGF$_{2\alpha}$ and PGF$_{3\alpha}$ were previously named bisdehydro-PGF and tetradehydro-PGF, respectively. See our said copending application Ser. No. 203,752.

With regard to Formula II, examples of hydrocarbyl of not more than 13 carbon atoms are alkyl, e.g., methyl, propyl, hexyl, decyl; cycloalkyl, e.g., cyclopropyl, 2-butylcyclopropyl, cyclobutyl, cyclobutylmethy, 3-pentylcyclobutyl, 2,2-dimethylcyclobutyl, cyclopentyl, 3-tert-butylcyclopentyl, 2-cyclopentylethyl, cyclohexyl, cyclohexymethyl; aralkyl, e.g., benzyl, phenethyl, 1-phenylethyl, 2-phenylpropyl, 3-phenylbutyl, 2-(1-naphthylethyl), benzhydryl; aryl, e.g., phenyl, p-tolyl, p-ethylphenyl, p-tert-butylphenyl, 1-naphthyl; and such unsaturated moieties as allyl, crotyl, and propargyl.

With regard to Formulas II and III, examples of lower alkanoyl are alkanoyl of 2 to 8 carbon atoms, inclusive, e.g., acetyl, propionyl, butyryl, valeryl, hexanoyl, heptanoyl, octanoyl, and branched chain isomeric forms of those, e.g., isobutyryl and isovaleryl.

The novel compounds of Formulas I, II, III, IV, and V, i.e., $PGF_{2\alpha}$, $PGF_{3\alpha}$, and their salts, esters, trialkanoates, and ester-trialkanoates are extremely potent in causing stimulation of smooth muscle as shown, for example by tests on strips of guinea pig ileum, rabbit duodenum, or gerbil colon. These compounds are also highly active in potentiating other known smooth muscle stimulators, for example, oxytocic agents, e.g., oxytocin and the various ergot alkaloids including derivatives and analogs thereof. Accordingly, these novel Formulae I, II, III, IV, and V compounds are useful in place of or in combination with less than the usual amounts of these and other known smooth muscle stimulators whenever smooth muscle stimulation is needed to alleviate or prevent some physiological condition in mammals, including humans, useful domestic animals, pests, zoological specimens, and laboratory animals, for example, mice, rabbits, rats, and monkeys. For example, these compounds can be used to alleviate or prevent conditions of gastrointestinal atony in mammals, including humans, e.g., paralytic ileus following anesthesia and surgical operation or from other medical causes. For this purpose, the compound is administered parenterally, e.g., subcutaneously, intramuscularly, or by intravenous injection or infusion in a dose range 0.1 to 2 mg. per kg. of body weight per day, the exact dose depending on the age, weight, and condition of the patient or animals, and the frequency and route of administration. Small repeated doses are indicated when the aim is to prevent rather than alleviate the atony.

Another smooth muscle stimulatory area where these novel Formula I, II, III, IV, and V compounds are useful, especially that of Formula IV, is in the control or prevention of atonic uterine bleeding in mammals after abortion or delivery, to aid in the expulsion of the placenta, and during the puerperium. For this purpose, the compounds are administered by intravenous infusion immediately after abortion or delivery at a dose in the range about 0.1 to about 100 µg. per kg. of body weight per minute until the desired effect is obtained. Subsequent doses are given by intravenous, subcutaneous, or intramuscular injection or infusion during puerperium in the range 0.1 to 2 mg. per kg. of body weight per day, again the exact dose depending on the age, weight, and condition of the patient or animal.

In still another smooth muscle stimulatory area, these novel compounds of Formulas I, II, III, IV, and V, especially that of Formula IV, are surprisingly useful in place of oxytocin to induce labor in pregnant female animals, including man, cows, sheep, and pigs, at or near term, or in pregnant animals with intrauterine death of the fetus from about 20 weeks to term. For this purpose, the compound is infused intravenously at a dose of 0.1 to 100 µg. per kg. of body weight per minute until at or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started. An alternative route of administration is oral.

The novel compounds of Formulas I, II, III, IV, and V, especially that of Formula IV, are useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, $PGF_{2\alpha}$, for example, is administered systematically at a dose level in the range 0.1 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, expulsion of an embryo or a fetus is accomplished by similar administration of the compound during the first third of the normal mammalian gestation period.

The novel compounds of Formulas I, II, III, IV, and V are also useful in mammals, including man, as nasal decongestants. For this purpose, the compounds are used in a dose range of about 10 µg. to about 10 mg. per ml. of a pharmacologically suitable liquid vehicle or as an aerosol spray, both for topical application.

The novel Formulas I, II, III, IV, and V compounds of this invention are used for the purposes described above in free acid form, in ester form, in trialkanoate form, in ester-trialkanoate form, or in pharmacologically acceptable salt form. When the ester form is used, the ester is any of those within the above definition of $R_1$. However, it is preferred that the $R_1$ moiety not contain olefinic or acetylenic unsaturation. More preferred are alkyl esters wherein the alkyl moiety contains one to 8 carbon atoms, inclusive. Especially preferred are alkyl of one to 4 carbon atoms, inclusive. Of those alkyl, methyl and ethyl are especially preferred for optimum absorption of the compound by the body or experimental animal system.

Examples of alkyl of one to 4 carbon atoms are methyl, ethyl, propyl, isopropyl, butyl, isobutyl, sec-butyl and tert-butyl. Examples of alkyl of one to 8 carbon atoms are those mentioned above, and also pentyl, hexyl, heptyl, octyl, and branched chain isomers thereof, e.g., 2-ethylhexyl.

With regard to the trialkanoate or ester-trialkanoate forms of Formulas I and II, the alkanoyl moiety is any of those within the definition of $R_2$. However, acetyl is especially preferred for optimum absorption of the compound by the body or experimental animal system. In Formula II it is intended that all $R_2$ be hydrogen or that all be alkanoyl.

Pharmacologically acceptable salts of these Formulas I, II, III, IV, and V compounds wherein $R_3$ is hydrogen useful for the purposes described above are those with pharmacologically acceptable metal cations, ammonium, amine cations, or quaternary ammonium cations.

Especially preferred metal cations are those derived from the alkali metals, e.g., lithium, sodium and potassium, and form the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2 - amino - 2-methyl-1-propanol, tris(hydroxymethyl)aminomethane, N-phenylethanolamine, N - (p - tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethlammonium, and the like.

When the novel Formula I, II, III, IV, and V compounds are used for intravenous injection or infusion, sterile aqueous isotonic solutions are preferred. For that purpose, it is preferred because of increased water solubility that a Formula IV or V acid or salt be used. For subcutaneous or intramuscular injection, sterile solutions or suspensions of the acid, salt, ester, or alkanoate in aqueous or non-aqueous media are used. Tablets, capsules, and liquid preparations such as syrups, elixers, and simple solutions, with the usual pharmaceutical carriers, are used for oral or sublingual administration. For rectal, vaginal, or intrauterine administration, suppositories, lavage and douche preparations, and solutions as such or contained in a sponge, all prepared by methods known in the art, are used.

$PGF_{2\alpha}$ is prepared from the carboxylic acid known as $PGE_2$. $PGF_{3\alpha}$ is prepared from the carboxylic acid known as $PGE_3$. $PGE_2$ and $PGE_3$ were previously designated bisdehydro-PGE and tetradehydro-$PGE_1$ respectively, and the preparation of both of these reactant acids is described in our said copending application Ser. No. 203,752. The structural formulas of $PGE_2$ (VI) and $PGE_3$ (VII) are as follows:

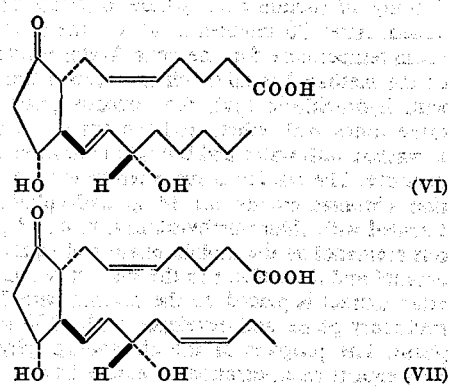

In these transformations of $PGE_2$ and $PGE_3$ to $PGF_{2\alpha}$ and $PGF_{2\beta}$, the ring carbonyl of the PGE-type reactant is reduced to a secondary alcohol group with sodium borohydride in the presence of an inert diluent, advantageously, methanol. A mixture of two isomeric secondary alcohols is produced by each of these ring carbonyl reductions. For example, ring carbonyl reduction of $PGE_2$ gives a mixture of $PGF_{2\alpha}$ (Formula IV) and the isomeric compound known as $PGF_{2\beta}$. The latter compound has the structural formula:

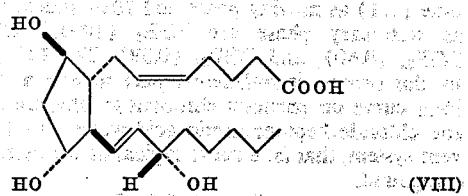

In a similar manner, ring carbonyl reduction of $PGE_3$ gives a mixture of $PGF_{3\alpha}$ and $PGF_{3\beta}$.

For these ring carbonyl reductions, a cold solution or suspension of sodium borohydride in methanol is added to a cold solution of the PGE-type reactant in methanol. The mixture is maintained cold for about 10 to 60 minutes, and is then maintained at about 25° C. for about one to two hours. The resulting mixture of $PGF_\alpha$-type and $PGF_\beta$ type products is then isolated and separated into its components by chromatography as described hereinafter. About three parts by weight of sodium borohydride is used for each part by weight of the PGE-type reactant. Suitable amounts of methanol are about 100 ml. for each gram of the PGE-type reactant and about 100 ml. for each gram of the sodium borohydride. A suitable cold temperature is about 0° C.

The acid of Formula IV, i.e., $PGF_{2\alpha}$, is also obtained from the lung tissues of sheep and pigs. Procedures for doing that are set forth in the examples, below.

Subsequent to our invention of the novel acid of Formula V, i.e., $PGE_{3\alpha}$, that compound was obtained from bovine lung tissues. See Biochim., Biophys. Acta, 84, 707 (1964).

As mentioned above $PGF_{2\alpha}$ and $PGF_{3\alpha}$ are prepared by sodium borohydride reduction of $PGE_2$ and $PGE_3$, respectively, and $PGF_{2\beta}$ and $PGF_{3\beta}$ are also produced in those reactions. The PGE-type reactants and the $PGF_\beta$-type byproducts have different spectra of biological activity than the desired $PGF_\alpha$-type products. For example, $PGE_2$ and $PGF_{2\beta}$ are highly active in lowering arterial blood pressure, while $PGF_{2\alpha}$ is not. When $PGF_{2\alpha}$ and $PGF_{3\alpha}$ are prepared by these borohydride reductions and are to be used for one or more of the above-described pharmacological purposes, it is desirable that they be made essentially free of these possible contaminating acids or salts thereof. By the term "essentially free" here is meant a degree of freedom from these other prostaglandind-like acids and salts such that the $PGF_{2\alpha}$ and the $PGF_{3\alpha}$ and their salts are suitable for the intended pharmacological uses, including parenteral administration to humans.

Also as mentioned above, $PGF_{2\alpha}$ and $PGF_{3\alpha}$ are obtainable from various mammalian lung tissues. These lung tissues contain many other components, i.e., pyrogens, antigens, proteins, enzymes, cellular material, and various other organic acids and salts thereof. When $PGF_{2\alpha}$ and $PGF_{3\alpha}$ are obtained from these lung tissues and are to be used for one or more of the above-described pharmacological purposes, it is necessary that they be made essentially free of these other lung tissues components, i.e., pyrogens, antigens, proteins, enzymes, cellular material, and other organic acids or salts thereof. By the term "essentially free" here is meant a degree of freedom from these impurities such that the $PGF_{2\alpha}$ and the $PGF_{3\alpha}$ are suitable for their intended pharmacological uses, including parenteral administration to humans. This definition of degree of purity will include $PGF_{2\alpha}$ and $PGF_{3\alpha}$ prepared either by borohydride reduction of $PGE_2$ and $PGE_3$, respectively, or from mammalian lung tissues, since the $PGE_2$ and $PGE_3$ reactants and the $PGF_{2\beta}$ and $PGF_{3\beta}$ byproducts in the borohydride reduction are included in the term "other organic acids and salts thereof."

When $PGF_{2\alpha}$ and $PGF_{3\alpha}$ are purified to the above-defined degree of purity, they are considered to be essentially pure and useable for all of the above-described pharmacological purposes.

When $PGF_{2\alpha}$ and $PGF_{3\alpha}$ are purified to the above-defined degree of purity, they will exhibit substantially ideal curves on partition chromatography using an ethylene chloride:heptane:acetic acid:water (15:15:6:4) solvent system. By the term "substantially ideal" is meant curves typical of the essentially pure compounds.

When a hydrocarbyl ester of $PGF_{2\alpha}$ or $PGF_{3\alpha}$ (Formula 11, $R_1$=hydrocarbyl and all $R_2$=H) is desired for one or more of the above-described pharmacological purposes, the $PGF_{2\alpha}$ or $PGF_{3\alpha}$ is esterified by procedures known in the art. Illustratively, the alkyl esters are prepared by reaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

An alternative method for esterification of the carboxyl moiety of these $PGF_\alpha$-type acids comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

When a trialkanoate of a Formula II ester or a Formula III acid is desired for one of the above-described pharmacological purposes, that is prepared by reacting the trihydroxy ester or trihydroxy acid with an alkanoic anhydride corresponding to an alkanoic acid of 2 to 8 carbon atoms, inclusive. Examples of these anhydrides are acetic anhydride, propionic anhydride, butyric anhydride, valeric anhydride, hexanoic anhydride, heptanoic anhydride, octanoic anhydride, and isomeric forms of those.

This reaction leading to these trialkanoates is advantageously carried out by mixing the hydroxy compound and the acid anhydride, preferably in the presence of a tertiary amine such as pyridine or triethylamine. A substantial excess of the anhydride is used, preferably about 10 to 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction, as well as any free carboxyl groups present in the hydroxy compound reactant.

The reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The desired trialkanoate is isolated from the reaction mixture by conventional methods. For example the excess anhydride is decomposed with water, and the resulting mixture acidified and then extracted with a solvent such as diethyl ether. The desired trialkanoate is recovered from the diethyl ether extract by evaporation. The trialkanoate is then purified by conventional methods, advantageously by chromatography.

The Formula I, III, IV, and V PGFα-type acids and alkanoates are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostaglandin derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichimetric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

The invention can be more fully understood by the following examples.

Example 1 $PGF_{2\alpha}$

A solution of 100 mg. of $PGE_2$ dissolved in 10 ml. of methanol is cooled in an ice bath. A chilled solution of 300 mg. of sodium borohydride in 35 ml. of methanol is added. After 20 minutes at 0° C., the mixture is left at room temperature for one hour. Water is added and most of the methanol is taken off in vacuo. After acidification with hydrochloric acid, the aqueous phase is extracted three times with ether, and the combined ether extract is washed with water and brought to dryness at room temperature. The residue is subjected to reversed phase partition chromatography on 18 g. hydrophobic kieselguhr (treated with chloromethylsilane), using 43 percent aqueous methanol as the mobile phase and equal parts of isooctanol and chloroform as the stationary phase. The dried ether extract is placed on the column with 16 ml. of the stationary phase and developed with 1200 ml. of mobile phase. The progress of the chromatography is followed by frequent microtitration of eluate fractions, using 0.02 N aqueous sodium hydroxide solution. Two peaks of acidity in the series of eluate fractions are observed. The eluate fractions included in the major area of each such acidity peak are separately combined and evaporated under reduced pressure. The residue from the first group of acidic eluate fractions to flow from the column is $PGF_{2\beta}$. The residue from the second group of acidic eluates to flow from the column is $PGF_{2\alpha}$. The paper chromatographic mobilities relative to $PGE_1$ on descending paper chromatography with ethylene chloride-heptane (1:1) as moving phase and 70% aqueous acetic acid as stationary phase are $PGE_1$ (100), $PGE_2$ (0.90), $PGF_{2\alpha}$ (0.60), and $PGF_{2\beta}$ (0.39). The $PGF_{2\alpha}$ obtained by this process is sufficiently pure to give a substantially ideal curve on partition chromatography, using an ethylene chloride:heptane:acetic acid:water (15:15:6:4) solvent system, that is, a curve typical of the essentially pure compound.

Example 2 $PGF_{3\alpha}$

Following the procedure of Example 1 but replacing the $PGE_2$ with $PGE_3$, a mixture of $PGF_{3\alpha}$ and $PGF_{3\beta}$ is obtained. The PGF$_{3\alpha}$ and PGF$_{3\beta}$ are separated as described in Example 1. The paper chromatographic mobilities relative to PGE$_1$ determined as described in Example 1 are PGE$_1$ (1.00), PGE$_3$ (0.76), PGF$_{3\alpha}$ (0.60), and PGF$_{3\beta}$ (0.37). The PGF$_{3\alpha}$ obtained by this process is sufficiently pure to give a substantially ideal curve on partition chromatography, using an ethylene chloride:heptane:acetic acid:water (15:15:6:4) solvent system, that is, a curve typical of the essentially pure compound.

Example 3 PGF$_{2\alpha}$

Freeze-dried sheep lungs (12 kg.) are suspended in distilled water, using four liters per kilogram of dried glands. After fifteen minutes, twelve liters of 95 percent ethanol are added. The minced glands are stirred mechanically for about one hour, and then left to sediment over night. The supernatant, clear ethanol solution, is decanted, and the insoluble residue is strained through cheesecloth and filtered. The supernatant and filtrate are combined and evaporated in vacuo to about 1/20 the original volume, i.e., to about three liters. This crude extract is itself extracted with about three liters of ether. The water phase is then acidified to pH 3.5 and extracted again with three liters of ether and then twice with 1.5 liters of ether. The combined ether extracts are extracted six times with 1/4 volume or about 2.25 liters of 0.2 molar phosphate buffer of pH 8. During the first extraction, the pH of the buffer has to be adjusted back to pH 8 with two normal sodium carbonate. The combined buffer phases are acidified to pH 3 with 6 normal hydrochloric acid and extracted with 1 volume, i.e., about 13.5 liters of ethyl acetate, then extracted three additional times each with seven liters of ethyl acetate. The ethyl acetate extracts are combined and washed until free of chloride ions with small portions of water, each water portion being passed through a second ethyl acetate phase. The ethyl acetate is evaporated in vacuo, leaving a solid residue. The dried residue is then taken up in petroleum ether and extracted three times with an equal volume of 57 percent aqueous ethanol. The aqueous ethanol extract is concentrated in vacuo to remove the ethanol, and the aqueous phase is extracted with ether and the ether extract is evaporated to dryness. The crude extract thus obtained is then partitioned on a partition column using 50 percent aqueous methanol as the mobile phase and a 50–50 mixture of isooctanol and chloroform as the stationary phase. The support is finely-divided, low-temperature polyethylene. Seven grams of the crude extract is put on the column with 67 ml. of stationary phase on 100 g. of the support. The column is then developed with 2200 ml. of mobile phase. The peak of physiological activity appears at about 1500 ml. The 700 to 2200 ml. fractions are pooled. The pooled fractions are concentrated to an aqueous phase, extracted with ether, and the ether extract evaporated to dryness. Two hundred and fifty mg. of this extract is put on a column of 45 g. of hydrophobic diatomite (kieselguhr treated with chloromethylsilane) saturated with 40 ml. of stationary phase (isooctanol-chloroform, 1:1) and developed with 2200 ml. of mobile phase (47.5 percent aqueous methanol). The peak of activity as determined by the microtitration and physiological activity appears at about 850 ml.

PGF$_{2\alpha}$ is isolated from the 850 ml. peak fractions by concentration to aqueous under reduced pressure, extraction with ether, and evaporation of the extract. The PGF$_{2\alpha}$ so obtained is sufficiently pure to give a substantially ideal curve on partition chromatography using the same ethylene chloride:heptane:acetic acid:water (15:15:6:4) solvent system used to show the purity of the PGF$_{2\alpha}$ obtained according to Example 1. Thus, the PGF$_{2\alpha}$ obtained by the above extraction process is essentially pure and is essentially free from pyrogens, antigens, proteins, enzymes, cellular material, and the other organic acids or salts thereof present in the sheep lung tissues. This PGF$_{2\alpha}$ also exhibits the same mobility relative to PGE$_1$, PGE$_2$, and PGF$_{2\beta}$ during paper chromatography as the PGF$_{2\alpha}$ prepared according to Example 1.

Example 4 PGF$_{2\alpha}$

Following the procedure of Example 3 but replacing the sheep lung with pig lungs, PGF$_{2\alpha}$ of the same degree of purity is obtained.

Example 5 PGF$_{2\alpha}$ methyl ester

To a dry ether solution of one milligram of PGF$_{2\alpha}$ is added a slight excess of diazomethane prepared in ether from four micromoles of nitrosomethylurethane. The reaction mixture is allowed to stand about 5 minutes, and the ether and excess diazomethane are then distilled off. On distillation to dryness, PGF$_{2\alpha}$ methyl ester is obtained.

Example 6 PGF$_{3\alpha}$ methyl ester

Following the procedure of Example 5, PGF$_{3\alpha}$ is transformed to its methyl ester.

Example 7 methyl ester triacetate

PGF$_{2\alpha}$ methyl ester (10 mg.) is mixed with acetic anhydride (2 ml.) and pyridine (2 ml.). The resulting mixture is allowed to stand at 25° C. for 18 hours. The reaction mixture is then cooled externally with ice, diluted with water, and then acidified with dilute hydrochloric acid to pH 1. That mixture is extracted three times with diethyl ether. The combined extracts are washed successively with dilute hydrochloric acid, dilute aqueous sodium bicarbonate solution, and water, dried, and evaporated to give PGF$_{2\alpha}$ methyl ester triacetate.

Example 8 PGF$_{3\alpha}$ methyl ester triacetate

Following the procedure of Example 7, PGF$_{3\alpha}$ methyl ester is transformed to the triacetate.

The methyl esters and methyl ester triacetates of Examples 5, 6, 7, and 8 have the following retention times:

| PGF$\alpha$-type | Methyl ester | Methyl ester triacetate |
|---|---|---|
| PGF$_{2\alpha}$ | 0.91 | 0.99 |
| PGF$_{3\alpha}$ | 0.91 | 0.98 |

Conditions: Flash heater at 200° C.; Column temperature 200° C.; Column pressure 1.0 kg./cm.²; Column 6 ft. x 5 mm. packed with 0.5% QF-1 (Dow Corning Corp.) on Gas Chrom P (Applied Science Laboratory, Inc.), as described by Vanden Heuvel et al., J. Am. Chem. Soc. 83, 1513 (1961).

Following the procedures of Example 5 but replacing diazomethane with diazoethane, diazobutane, 1-diazo-2-ethylhexane, cyclohexyldiazomethane, and phenyl-diazomethane, and using PGF$_{2\alpha}$ and PGF$_{3\alpha}$ each in turn, there are obtained the ethyl, butyl, 2-ethylhexyl, cyclohexylmethyl, and benzyl esters of each of PGF$_{2\alpha}$ and PGF$_{2\beta}$.

Also following the procedure of Example 7 but using propionic anhydride, isobutyric anhydride, and hexanoic anhydride each in place of acetic anhydride, and using each in turn PGF$_{2\alpha}$, PGF$_{3\alpha}$, and the methyl, ethyl, butyl, 2-ethylhexyl, cyclohexylmethyl, and benzyl esters of each of PGF$_{2\alpha}$ and PGF$_{3\alpha}$, there are obtained the tripropionates, triisobutyrates, and trihexanoates of each of PGF$_\alpha$ acids and esters. Also following the procedure of Example 9, the triacetates of these other PGF$_\alpha$ esters are obtained.

What is claimed is:

1. A compound of the formula:

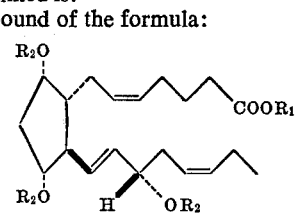

(V)

wherein $R_1$ is hydrocarbyl of not more than 13 carbon atoms, and wherein all $R_2$ are hydrogen or all $R_2$ are lower alkanoyl.

2. A compound according to claim 1 wherein $R_1$ is alkyl of one to 8 carbon atoms, inclusive, and all $R_2$ are hydrogen.

3. A compound according to claim 1 wherein $R_1$ is methyl and all $R_2$ are hydrogen.

4. A compound according to claim 1 wherein $R_1$ is alkyl of one to 8 carbon atoms, inclusive, and wherein all $R_2$ are lower alkanoyl.

5. A compound according to claim 1 wherein $R_1$ is alkyl of one to 8 carbon atoms, inclusive, and wherein all $R_2$ are acetyl.

6. A compound according to claim 1 wherein $R_1$ is methyl and all $R_2$ are acetyl.

7. A compound of the formula:

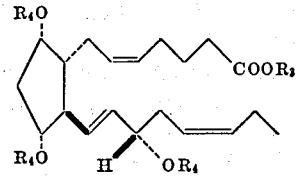

wherein $R_3$ is hydrogen or a pharmacologically acceptable cation, and wherein $R_4$ is lower alkanoyl.

8. A compound according to claim 7 wherein $R_3$ is hydrogen.

9. A compound according to claim 8 wherein $R_4$ is acetyl.

10. A compound of the formula:

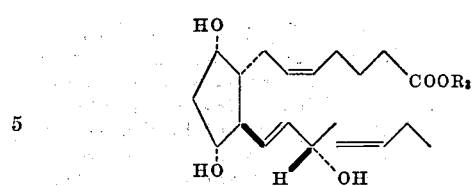

wherein $R_3$ is hydrogen or a pharmacologically acceptable cation, said compound being essentially free of pyrogens, antigens, proteins, enzymes, cellular material, and other organic acids or salts thereof.

11. A compound according to claim 10 wherein $R_3$ is hydrogen, said compound being 7-[3α,5α-dihydroxy-2β-[(3S)-3-hydroxy-trans-1,cis-5-octadienyl] - 1α - cyclopentyl]-cis-5-heptenoic acid.

12. A compound according to claim 10 wherein $R_3$ is a pharmacologically acceptable cation, said compound being a salt of 7-[3α,5α-dihydroxy-2β-[(3S)-3-hydroxy-trans - 1,cis-5-octadienyl]-1α-cyclopentyl]cis-5-heptenoic acid.

References Cited

Linn et al. Biochem. Pharmacology 8, 339 (1969).

LORRAINE A. WEINBERGER, Primary Examiner

R. GERSTL, Assistant Examiner

U.S. Cl. X.R.

260—211 R, 247.2 R, 268 R, 293.65, 326.3, 410, 429.9, 430, 439, 448 R, 488 R, 501.1, 501.15, 510.17, 501.2, 514 D

UNITED STATES PATENT OFFICE
CERTIFICATE OF CORRECTION

Patent No. 3,804,879  Dated April 16, 1974

Inventor(s) Sune Bergstrom and Jan Sjovall

It is certified that error appears in the above-identified patent and that said Letters Patent are hereby corrected as shown below:

Column 1, line 18, "alkanates" should read -- alkanoates --; line 19, "variety if pharmacological" should read -- variety of pharmacological --; line 71, "more than 1 carbon atoms," should read -- more than 13 carbon atoms, --. Column 2, lines 4-15, Formula III, that portion of the formula reading

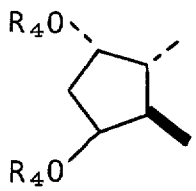　　should read　　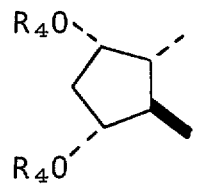

and

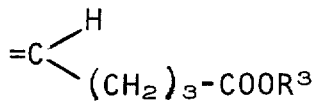　　should read　　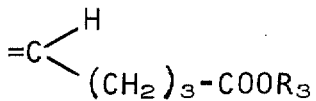

Column 4, lines 51-52, "Formulas I, II, III, IV, and V compounds" should read -- Formula I, III, IV, and V compounds --.

UNITED STATES PATENT OFFICE
CERTIFICATE OF CORRECTION

Patent No. 3,804,879　　　　　　　　　　Dated April 16, 1974

Inventor(s) Sune Bergstrom and Jan Sjovall

It is certified that error appears in the above-identified patent and that said Letters Patent are hereby corrected as shown below:

Column 12, Formula, Claim 10, that portion of the formula reading should read 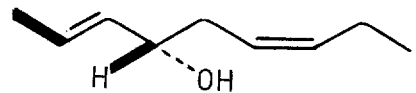

[SEAL]

Attest:

Signed and Sealed this

Eighteenth Day of April 1978

RUTH C. MASON  
*Attesting Officer*

LUTRELLE F. PARKER  
*Acting Commissioner of Patents and Trademarks*